US009475162B2

(12) United States Patent
Chang et al.

(10) Patent No.: US 9,475,162 B2
(45) Date of Patent: Oct. 25, 2016

(54) POSITIONING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hsiu-Lung Chang, New Taipei (TW); Wei Yang, Shenzhen (CN); Ke Hu, Shenzhen (CN); Jian Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 173 days.

(21) Appl. No.: 14/534,367

(22) Filed: Nov. 6, 2014

(65) Prior Publication Data

US 2015/0123333 A1 May 7, 2015

(30) Foreign Application Priority Data

Nov. 6, 2013 (CN) .......................... 2013 1 0543297

(51) Int. Cl.
*B23Q 3/18* (2006.01)
*B23Q 3/06* (2006.01)

(52) U.S. Cl.
CPC ................ *B23Q 3/18* (2013.01); *B23Q 3/062* (2013.01)

(58) Field of Classification Search
CPC ........ B23Q 3/06; B23Q 3/183; B23Q 3/186; B25B 11/00; B25B 11/02
USPC ............................ 29/271, 281.1; 269/47, 48
See application file for complete search history.

(56) References Cited

U.S. PATENT DOCUMENTS

| | | | | | |
|---|---|---|---|---|---|
| 2,261,055 | A | * | 10/1941 | Dulaney ................ | G04D 1/025 269/160 |
| 2,271,879 | A | * | 2/1942 | Wallace ................ | B25B 31/005 269/48.4 |
| 2,385,180 | A | * | 9/1945 | Allen ........................ | F16B 5/10 411/403 |
| 3,064,715 | A | * | 11/1962 | Bland ........................ | G01S 1/72 156/556 |
| 3,218,058 | A | * | 11/1965 | Smith ........................ | B25B 5/02 269/166 |
| 3,518,745 | A | * | 7/1970 | Gray ........................ | B23P 19/00 29/243.53 |
| 3,612,507 | A | * | 10/1971 | Stokes ................ | F04B 39/1033 269/287 |
| 4,397,094 | A | * | 8/1983 | Nakamura ............. | B21D 37/12 29/271 |
| 4,570,320 | A | * | 2/1986 | Kile ........................ | F02B 77/00 29/271 |

(Continued)

*Primary Examiner* — Joseph J Hail
*Assistant Examiner* — Tyrone V Hall, Jr.
(74) *Attorney, Agent, or Firm* — Zhigang Ma

(57) ABSTRACT

A positioning device includes a fixing mechanism, a first positioning assembly, a second positioning assembly. The fixing mechanism includes a base, a first moving member movably passing through the base, and a second moving member movably passing through the base. The first positioning assembly includes a bottom board and two first guide portions protruding from the bottom board. Each first guide portion forms one first incline surface. The second positioning assembly includes a base body and two second guide portions. The base body is positioned between the two first guide portions respectively positioned on opposite side surfaces of the base body. Each second guide portion forms a guiding surface. The first moving member is fixed with the bottom board at one end away from the base. The second moving member is fixed with the base body at one end away from the base.

16 Claims, 4 Drawing Sheets

(56) References Cited

U.S. PATENT DOCUMENTS

| | | | | |
|---|---|---|---|---|
| 5,062,200 A * | 11/1991 | Lanfranco | ............ | H02K 15/024 29/281.1 |
| 5,566,840 A * | 10/1996 | Waldner | ............ | G03F 9/00 211/41.17 |
| 6,293,534 B1 * | 9/2001 | Leban | ............ | B23Q 1/032 269/20 |
| 6,412,768 B1 * | 7/2002 | Peckham | ............ | H05K 13/0069 269/203 |
| 7,003,827 B2 * | 2/2006 | DeMayo | ............ | A61G 13/10 248/229.14 |
| 7,634,853 B2 * | 12/2009 | Nguyen | ............ | B25J 9/1687 29/283 |
| 8,608,148 B2 * | 12/2013 | Ruf | ............ | B29C 33/305 269/10 |
| 2008/0203644 A1 * | 8/2008 | DaSilva | ............ | A61B 17/02 269/309 |
| 2010/0276859 A1 * | 11/2010 | Maciejewski | ............ | G02B 23/22 269/60 |
| 2011/0167604 A1 * | 7/2011 | Stewart | ............ | A47B 88/0055 29/271 |
| 2012/0321379 A1 * | 12/2012 | Wang | ............ | F16B 5/0642 403/321 |

* cited by examiner

POSITIONING DEVICE

FIELD

The subject matter herein generally relates to a positioning device for positioning a workpiece having a positioning hole.

BACKGROUND

Positioning devices are usually applied for positioning workpieces in machining, assembly or other process.

BRIEF DESCRIPTION OF THE DRAWINGS

Implementations of the present technology will now be described, by way of example only, with reference to the attached figures.

DETAILED DESCRIPTION

Figure 1:
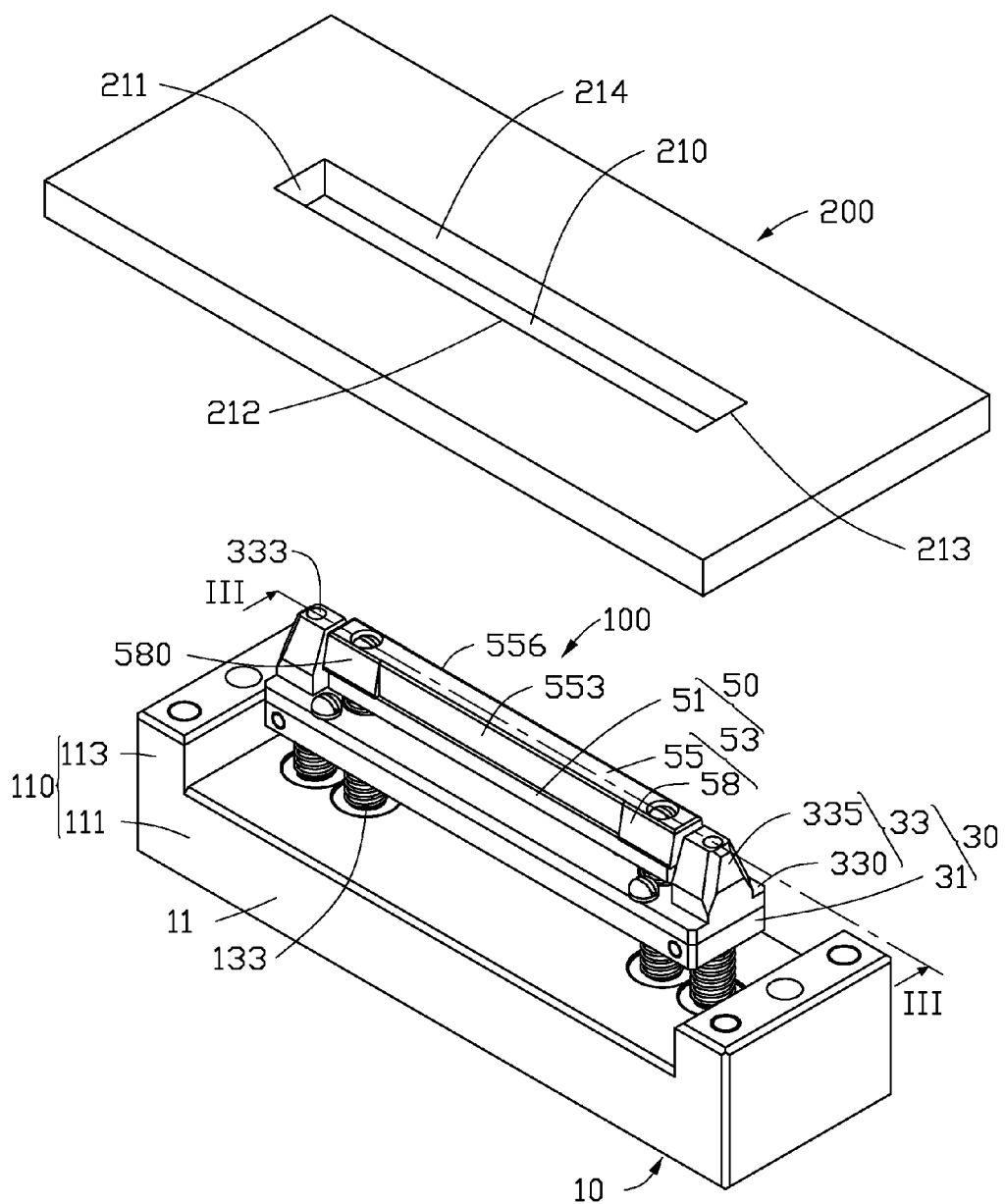
FIG. 1 illustrates an isometric view of one embodiment of a positioning device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

A positioning device can include a fixing mechanism, a first positioning assembly, a second positioning assembly. The fixing mechanism include a base, a first moving member movably passing through the base, and a second moving member movably passing through the base. The first positioning assembly includes a bottom board and two first guide portions separately protruding from the bottom board. Each first guide portion forms one first incline surface. The second positioning assembly is positioned above bottom board away from the base. The second positioning assembly can include a base body and two second guide portions. The base body is positioned between the two first guide portions respectively positioned on opposite side surfaces of the base body. Each second guide portion forms a guiding surface. The first moving member is fixed with the bottom board at one end away from the base. The second moving member is fixed with the base body at one end away from the base.

FIG. 1 illustrates a positioning device 100 for positioning a workpiece 200. A positioning hole 210 can be defined in the workpiece 200. Each positioning hole 210 can be in a substantially rectangular shape. The workpiece 200 can include four sidewalls. The four sidewalls can be a first sidewall 211, a second sidewall 212, a third sidewall 213, and a fourth sidewall 214. The first sidewall 211, the second sidewall 212, the third sidewall 213, and the fourth sidewall 214 can cooperatively form the position hole 210. The positioning device 100 can extend into the positioning hole 210 to position the workpiece 200.

The positioning device 100 can include a fixing mechanism 10, a first positioning assembly 30 mounted on the fixing mechanism 10, a second positioning assembly 50 positioned above the first positioning assembly 30. Both the first positioning assembly 30 and the second positioning assembly 50 can be movably coupled to the fixing mechanism 10.

Figure 2:
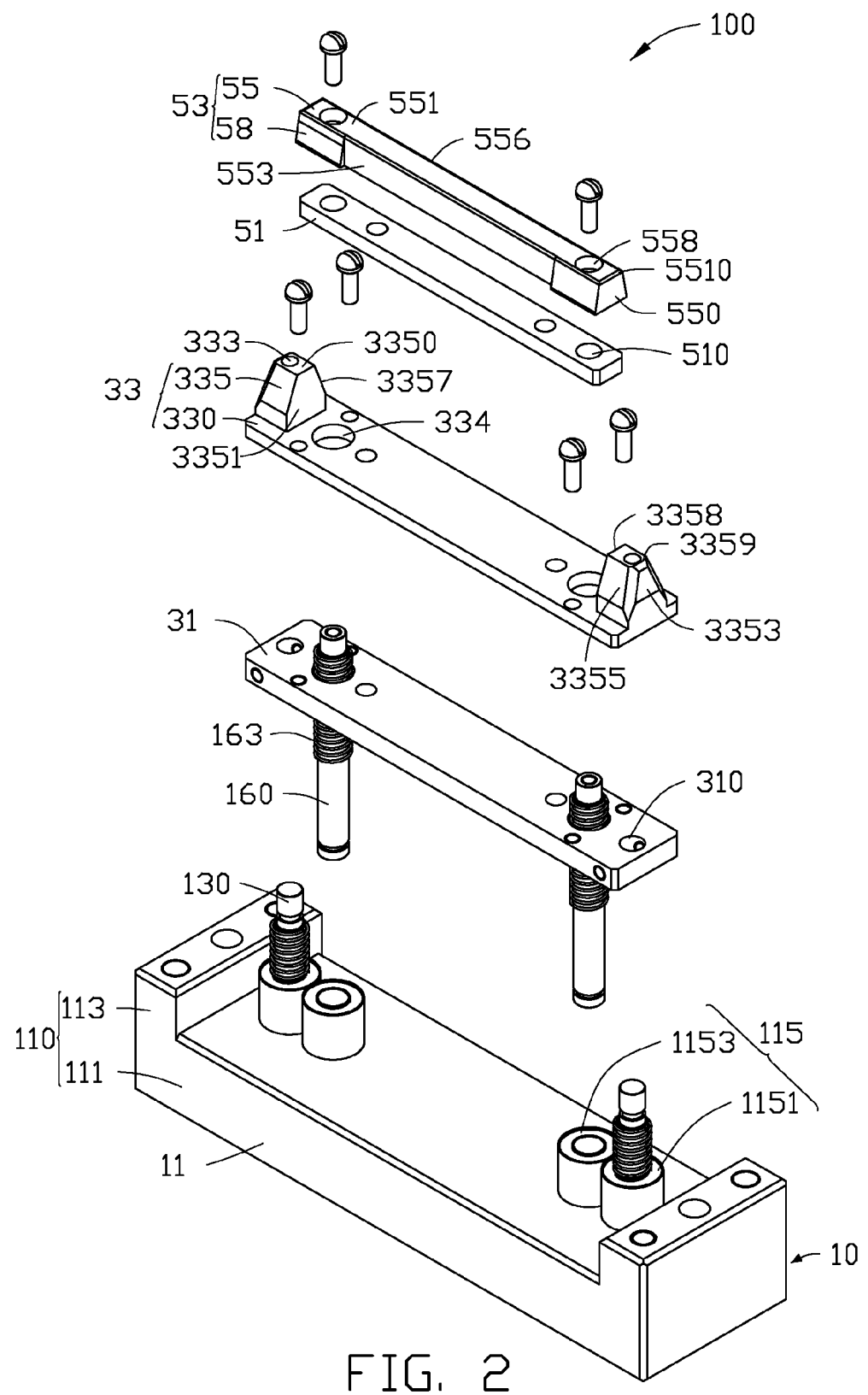
FIG. 2 illustrates an exploded, isometric view of the positioning device of FIG. 1.
Figure 3:
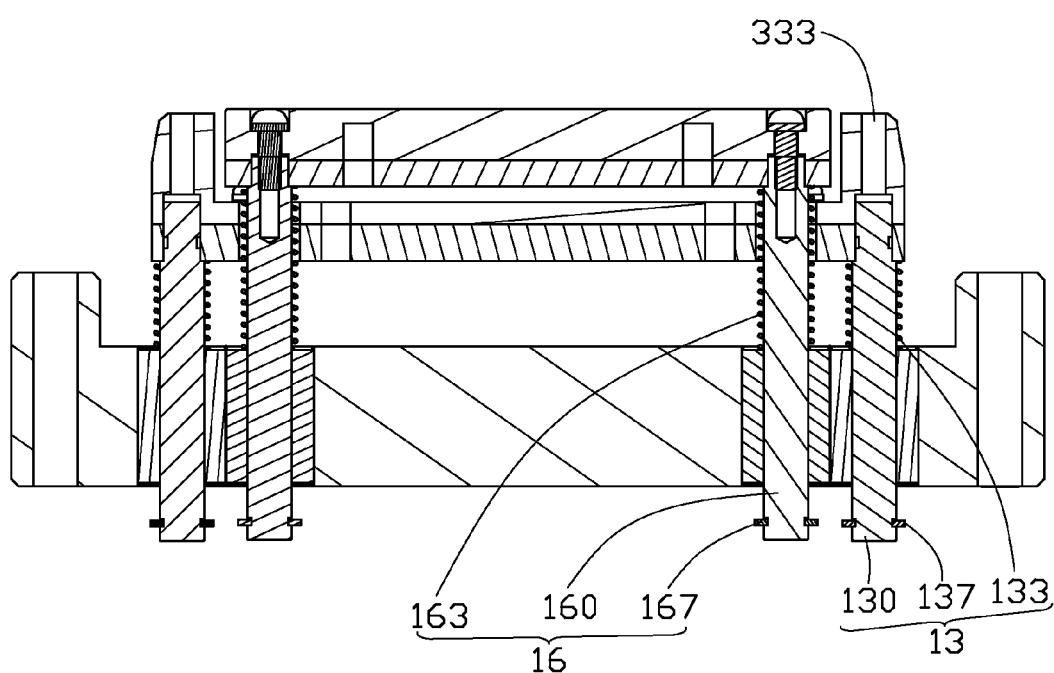
FIG. 3 illustrates a cross-sectional view of the positioning device of FIG. 1 along a line III-III.

Also referring to FIGS. 2 and 3, the fixing mechanism 10 can include a base 11, two first moving assemblies 13 (as shown in FIG. 3), and two second moving assemblies 16 (as shown in FIG. 3). The first moving assemblies 13 and the second moving assemblies 16 can be movably mounted on the base 11. The base 11 can include a seat 110 and four guiding members 115 received in the seat 110. The seat 110 can include a main body 111 and two extending portions 113 extending from the main body 111. The extending portions 113 can be configured for coupling with a worktable of a machine tool (not shown) or the like. In the illustrated embodiment, the guiding members 115 are linear bearings; the four guiding members 115 can include two first guiding members 1151 and two second guiding members 1153. One first guiding member 1151 and one second guiding member 1153 can be positioned adjacent to one extending portion 113. Another one first guiding member 1151 and another one second guiding member 1153 can be positioned adjacent to another extending portion 113. The two second guiding members 1151 can be positioned between the two first guiding members 1153. The four guiding members 115 can be arranged in line, four central axes of the guiding members 115 can be in a same plane.

Also referring to FIG. 3, each first moving assembly 13 can include a first moving member 130, a first elastic member 133, and a first snap ring 137. Each first moving member 130 can pass through one respective first guiding member 1151. Two ends of each first moving member 130 can be positioned outside of the main body 111. Each first elastic member 133 can sleeve on the first moving member 130 at first end portion of the one respective first moving member 130. The first snap ring 137 can be clamped on a second end portion of the one respective first moving member 130. A structure of each second moving assembly 16 can be same as each first moving assembly 13. Each second moving assembly 16 can include a second moving member 160, a second elastic member 163, and a second snap ring 167. Each second moving member 160 can pass through one respective second guiding member 1153. Two ends of each second moving member 160 can be positioned outside of the main body 111. Each second elastic member 163 can sleeve on the second moving member 160 at a first end portion of one respective second moving member 160. The second snap ring 167 can be clamped on a second end portion of the one respective second moving member 160. In the illustrated embodiment, the elastic member 133 and the elastic member 163 are elastic springs. In other embodiments, the elastic member 133, the elastic member 163 can be elastic sleeves or elastic pieces.

Referring to FIG. 2 again, the first positioning assembly 30 can include a first mounting member 31 and a first guide block 33 fixed with the first mounting member 31. Four first through holes 310 can be separately defined in the first mounting member 31 corresponding to the first moving assemblies 13 and the second moving assemblies 16. One end of each first moving member 130 away from the main body 111 can pass through one first through hole 310, such that each first elastic member 133 can be resisted between the main body 111 and the first mounting member 31. One end of each second moving member 160 away from the main body 111 can be received in one first through hole 310, such that each first elastic member 133 can resist between the one respective first guiding member 1151 and the first mounting member 31.

The first guide block 33 can include a bottom board 330 and two first guide portions 335 separately protruding from the bottom board 330. Two second through holes 333 corresponding to the two first moving assemblies 13 and the third through holes 334 corresponding to the two second moving assemblies 16 can be defined in the first guide block 33. Each second through hole 333 can be defined at one first guide portion 335 and the base board 330. Two third through holes 334 can be defined in the base board 330 and positioned between the two first guide portions 335. Each first moving member 130 can movably pass through one second through hole 333. Each second moving member 160 can movably pass through one third through hole 334.

Each first guide portion 335 can include a first surface 3350, a vertical surface 3351, a first incline surface 3353, a second incline surface 3355, and a third incline surface 3357. The first surface 3350 can be substantially parallel to the bottom board 330. The vertical surface 3351 can be substantially perpendicularly coupled between the first surface 3350 and the bottom board 330. The vertical surface 3351 can be opposite to the first incline surface 3353. The vertical surface 3351 can be coupled between the second incline surface 3355 and the third incline surface 3357. Two vertical surfaces of the two first guide portions 335 can be face to face. A first joint edge 3358 can be formed between the vertical surface 3351 and the first surface 3350. A second joint edge 3359 can be formed between the incline surface 3353 and the first surface 3350. A first angle formed between the first incline surface 3353 and the bottom board 330 can be greater than or equal to 75 degrees. A second angle can be formed between the second incline surface 3355 and the bottom board 330 can be greater than or equal to 75 degrees. A third angle can be formed between the third incline surface 3357 and the bottom board 330 can be greater than or equal to 75 degrees. In the illustrated embodiment, the first guide block 33 can be made of plastic steel.

The second positioning assembly 50 can include a second mounting member 51 and a second guide block 53 fixedly mounted on the second mounting member 51.

The second mounting member 51 can be positioned on the bottom board 330 and located between the two first guide portions 335. Two fourth through holes 510 can be defined in the second mounting member 51 corresponding to the two second moving members 160. An end of each second moving member 160 away from main body 111 can be received and fixed in one respective fourth through hole 510, thereby the second elastic members 160 can be resisted between the second mounting member 51 and the one respective second guiding member 115.

The second guide block 53 can include a base body 55 and four wedged-shaped second guide portions 58 protruding from the base body 55. The base body 55 can include two end surfaces 550, a second surface 551, a third surface 553, and a fourth surface 556. Each end surface 550 can be opposite to one vertical surface 3351. The second surface 551 can be substantially parallel to and away from the second mounting member 51. The second surface 551 can be coupled between the third surface 553 and the fourth surface 556. A third joint edge 5510 can be formed between each end surface 550 and the second surface 551. The third joint edges 5510 can be parallel to the first joint edge 3358. A length of each third joint edge 5510 can be greater than lengths of the first joint edge 3358 and the second joint edge 3359. Two separate fifth through holes 558 can be defined in the base body 55. One end of each second moving member 160 away from the seat 110 can be received in one fifth through hole 558. Two wedged-shaped second guide portions 58 can be respectively positioned on two ends of the third surface 553. Other two wedged-shaped second guide portion 58 can be respectively positioned on two ends of the fourth surface 556. A guiding surface 580 can be formed on each wedged-shaped second guide portion 335 (as shown in FIG. 1). An inclining direction of guiding surfaces 580 positioned on the third surface 553 can be same as the second incline surface 3355. An inclining direction of the guiding surfaces 580 positioned on the fourth surface 556 can be same as the third incline surface 3357. An angle formed between each guiding surface 580 and the base body 55 can be less than or equal to 15 degrees. In other embodiments, the number of the guiding surface 580 can be two, or more.

In assembly, the guiding members 115 can be positioned in the base 11, the first moving members 130 and the second moving members 160 can pass through corresponding guiding members 115, respectively. Each first elastic member 133 can be sleeve on one first moving member 130. Each second elastic member 160 can sleeve on one second moving member 160. The first mounting member 31 can be fixed with the first guide block 33. The second mounting member 51 can be fixed with the second guide block 53. The first mounting member 31 and the first guide block 33 can be fixedly sleeved on the first moving members 130 and the second moving members 160. Each first elastic member 133 can resist between one first guiding member 1151 and the first mounting member 31. The second mounting member 51 and the second guide block 53 can be fixedly sleeved on the second moving members 160. Each second elastic member 163 can resist between the second mounting member 51 and one second guiding member 1153. The first snap ring 137 and second snap ring 167 can be clamped with the first moving members 130 and the second moving members 160, respectively.

Figure 4:
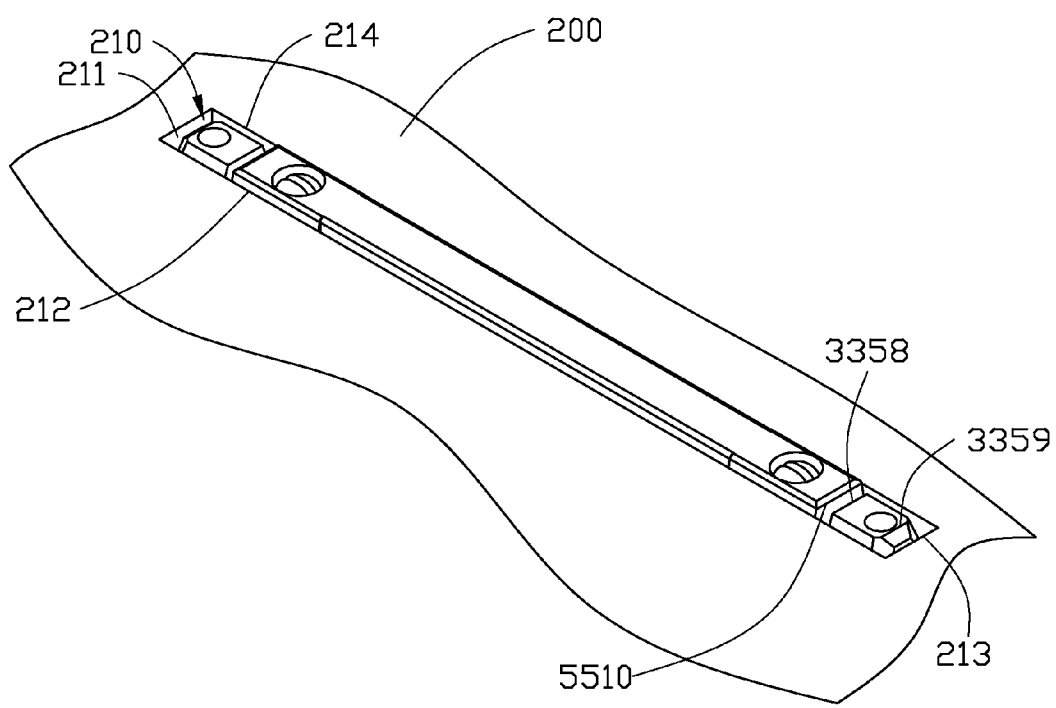
FIG. 4 illustrates an isometric, partial view of the positioning device of FIG. 1 in operation.

In use, also referring to FIG. 4, the positioning device 100 can be fixed on one worktable. The workpiece 200 will slide relative to the first guide blocks 33 along the second guide portions 335 because of the workpiece 200 own weight, when the positioning hole 210 is aligned with the first positioning assembly 30 and the second positioning assembly 35 in line. The two first incline surfaces 3353 will limit motions of the workpiece 200 along a direction substantially parallel to the second sidewall 212. The four guiding surfaces 580 can limit motions of the workpiece 200 along a direction substantially parallel to the first sidewall 211.

In a situation that the positioning hole 210 are not arranged with the first guide blocks 33 in line, thus the first sidewall 211, the third sidewall 213 and the first guide portions 335 deviate from corresponding one first incline surface 3353. The first positioning assembly 30 can be pressed downward the seat 110, then two guiding surfaces 580 resist against the second sidewall 212 and other two guiding surfaces 580 resist against the fourth sidewall 214 for limiting motions along the direction substantially parallel to the first sidewall 211. Each first elastic member 133 resists corresponding one first positioning assembly 30 to enable the two first guide portions 335 stretch into the positioning hole 210. The first sidewall 211 can resist against the first incline surfaces 3353, and the third sidewall 212 can resist against the first incline surfaces 3353 for limiting motions of the workpiece 200 along the direction substantially parallel to the second sidewall 212.

In a situation that the positioning hole 210 are not arranged with the second guide blocks 53 in line, thus the second sidewall 212 and the fourth sidewall 214 deviate from corresponding one guiding surface 3353. A position of the workpiece 200 can be adjusted along the first sidewall 211, then the second guide block 53 can extend into the positioning hole 210, and the second sidewall 212 and the fourth sidewall 214 resist against the fourth guiding surfaces 580 to position the workpiece 200.

The first positioning assembly 30 and the second positioning assembly 50 can be separately positioned in the positioning device 100. The two first incline surface 3353 can be configured for limiting motions of the workpiece 200 along the direction substantially parallel to the second sidewall 212. The four guiding surfaces 580 can be configured for limiting motions of the workpiece 200 along the direction substantially parallel to the first sidewall 211.

In at least one embodiment, the extending portions 113 can be omitted. The main body 111 can be directly assembled with the worktable or the like in use.

In at least one embodiment, the guiding members 115 can be omitted, the first moving member 130 and the second moving member 160 can directly pass through the main body 111.

In at least one embodiment, the first mounting member 31 can be omitted, the first moving member 130 and the second moving member 160 directly assembled to the first guide block 33.

In at least one embodiment, the second mounting member 51 can be omitted, and the second moving member 160 directly assembled to the second guide block 53.

In at least one embodiment, the first guide block 33 and the second guide block 53 can be made of other material, not limit to the plastic steel.

In at least one embodiment, the positioning hole 210 can be not limited to a rectangular hole, the positioning hole 210 can be in a circular, or triangle, or polygon, or other shapes. The first incline surface 3353 and the guiding surfaces 580 can be designed to fit over sidewalls of the positioning hole 210, and the positioning device 100 can clamp lower end of the sidewalls of the positioning hole 210 for limiting motions of the workpiece 200.

In at least one embodiment, the number of the guiding surfaces 580 can be at least two, the at least two guiding surfaces 580 are respectively positioned on opposite two side surfaces of the base body 55.

The embodiments shown and described above are only examples. Many details are often found in the art such as the other features of a positioning device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A positioning device configured for positioning a workpiece, the workpiece comprising a first sidewall, a second sidewall, a third sidewall, and a fourth sidewall, the first sidewall, the second sidewall, the third sidewall, and the fourth sidewall cooperatively forming a positioning hole, the first sidewall being opposite to the third sidewall, the second sidewall being opposite to the fourth sidewall, the positioning device comprising:

a fixing mechanism comprising:
  a base;
  a first moving assembly comprising a first moving member, a first elastic member, the first moving member movably passing through the base, and the first elastic member sleeved on the first moving member; and
  a second moving assemblies comprising a second moving member and a second elastic member, the second moving member movably passing through the base, and the second elastic member sleeved on the second moving member;
a first positioning assembly mounted on the fixing mechanism, the first positioning assembly comprising a bottom board and two first guide portions separately protruding from the bottom board, each first guide portion forming one first incline surface, one first incline surface configured for resisting against the first sidewall, and another one first incline surface configured for resisting against the third sidewall; and
a second positioning assembly positioned above bottom board away from the base, the second positioning assembly comprising a base body and two second guide portions, the base body positioned between the two first guide portions, the two second guide portions respectively positioned on opposite side surfaces of the base body, each second guide portion comprising a guiding surface, one guiding surface configured for resisting against the second sidewall, and another one second guiding surface configured for resisting agonist the fourth sidewall,
wherein the first moving member is fixed with the bottom board at one end away from the base, the first elastic member is resisted between the base and the bottom board;
the second moving member is fixed with the base body at one end away from the base, the second elastic member is resisted between the base and the base body;
the first guide portions are configured for stretching into the positioning hole to enable one first incline surface resist against the first sidewall and another one first incline surface resisting against the third sidewall, such that motions of the workpiece along a direction substantially parallel to the second sidewall is limited; the second sidewall resiliently cooperates with one guiding surface, and the fourth sidewall resiliently cooperates with another guiding surface, thereby imposing a limiting resistance to motion of the workpiece along a direction substantially parallel to the first sidewall.

2. The positioning device of claim 1, wherein an angle formed between the first incline surface and the bottom board is greater than or equal to about 75 degrees, an angle formed between each guiding surface and the base body is less than or equal to about 15 degrees.

3. The positioning device of claim 1, wherein the first positioning assembly further comprises a first mounting member, the first moving member passes through the first mounting member each first elastic member resists the first moving member; the second positioning assembly further comprises a second mounting member, the second moving member resists against the second mounting member.

4. The positioning device of claim 1, wherein the first guide portion further comprises a first surface and a vertical surface, the first surface is substantially parallel to the bottom board, the vertical surface is substantially perpendicularly coupled to the first surface and opposed to the first incline surface, a first joint edge is formed between the vertical surface and the first surface, a second joint edge is formed between the incline surface and the first surface.

5. The positioning device of claim 4, wherein the base body comprises two end surfaces, a second surface, a third surface, and a fourth surface, each end surface is opposite to one vertical surface, the second surface is substantially parallel to and away from the second mounting member, the second surface is coupled between the third surface and the fourth surface, a third joint edge is formed between each end surface and the second surface, the third joint edges is parallel to the first joint edge, a length of each third joint edge is greater than lengths of the first joint edge and the second joint edge, two separate fifth through holes are defined in the base body.

6. The positioning device of claim 1, wherein the base comprises a seat, the seat comprises a main body and two extending portions extending from the main body, the first moving member passes through the main body.

7. The positioning device of claim 6, wherein the first moving assembly further comprises a first snap ring, the first snap ring is clamped with an end of the first moving member away from the first elastic member.

8. The positioning device of claim 6, wherein the second moving assembly further comprises a second snap ring clamped with an end of the first moving member away from the first elastic member.

9. The positioning device of claim 6, wherein the base further comprises at least two guiding members, the at least two guiding members are received in the seat, the first moving member passes through one of the at least two guiding members, and the second moving member passes through another one of the at least two guiding members.

10. The positioning device of claim 1, wherein the two first guide portions are made of plastic steel.

11. A positioning device comprising:
a fixing mechanism, comprising:
a base;
a first moving member movably passing through the base; and
a second moving member movably passing through the base;
a first positioning assembly comprising a bottom board and two first guide portions separately protruding from the bottom board, each first guide portion forming one first incline surface; and
a second positioning assembly positioned above bottom board away from the base, the second positioning assembly comprising a base body and two second guide portions, the base body positioned between the two first guide portions, the two second guide portions respectively positioned on opposite side surfaces of the base body, each second guide portion comprising a guiding surface,
wherein the first moving member is fixed with the bottom board at one end away from the base; and
wherein the second moving member is fixed with the base body at one end away from the base.

12. The positioning device of claim 11, wherein an angle formed between the first incline surface and the bottom board is greater than or equal to about 75 degrees, an angle formed between each guiding surface and the base body is less than or equal to about 15 degrees.

13. The positioning device of claim 11, wherein the fixing mechanism further comprises a first mounting member and a second mounting member, the first moving member passes through the first mounting member, each first elastic member resists the first moving member, and the second moving member resist against the second mounting member.

14. The positioning device of claim 11, wherein the first guide portion further comprises a first surface and a vertical surface, the first surface is substantially parallel to the bottom board, the vertical surface is substantially perpendicularly coupled to the first surface and opposed to the first incline surface, a first joint edge is formed between the vertical surface and the first surface, a second joint edge is formed between the incline surface and the first surface.

15. The positioning device of claim 14, wherein the base body comprises two end surfaces, a second surface, a third surface, and a fourth surface, each end surface is opposite to one vertical surface, the second surface is substantially parallel to and away from the second mounting member, the second surface is coupled between the third surface and the fourth surface, a third joint edge is formed between each end surface and the second surface, the third joint edges is parallel to the first joint edge, a length of each third joint edge is greater than lengths of the first joint edge and the second joint edge, two separate fifth through holes are defined in the base body.

16. The positioning device of claim 11, wherein the base comprises a seat, the seat comprises a main body and two extending portions extending from the main body, the first moving member passes through the main body.

* * * * *